(12) United States Patent
Nakayama

(10) Patent No.: US 11,144,963 B2
(45) Date of Patent: Oct. 12, 2021

(54) INFORMATION SERVICE SYSTEM AND INFORMATION SERVICE METHOD FOR PROVIDING LOCATION-SPECIFIC INFORMATION

(71) Applicant: N.GEN CORPORATION, Tokyo (JP)

(72) Inventor: Ryo Nakayama, Tokyo (JP)

(73) Assignee: N.GEN CORPORATION, Tokyo (JP)

(*) Notice: Subject to any disclaimer, the term of this patent is extended or adjusted under 35 U.S.C. 154(b) by 0 days.

(21) Appl. No.: 16/611,651

(22) PCT Filed: Mar. 12, 2018

(86) PCT No.: PCT/JP2018/009473
§ 371 (c)(1),
(2) Date: Nov. 7, 2019

(87) PCT Pub. No.: WO2018/220939
PCT Pub. Date: Dec. 6, 2018

(65) Prior Publication Data
US 2020/0098005 A1    Mar. 26, 2020

(30) Foreign Application Priority Data
May 30, 2017  (JP) .............................. JP2017-106985

(51) Int. Cl.
*G06Q 30/00* (2012.01)
*G06Q 30/02* (2012.01)
*H04W 4/029* (2018.01)

(52) U.S. Cl.
CPC ..... *G06Q 30/0261* (2013.01); *G06Q 30/0267* (2013.01); *G06Q 30/0269* (2013.01); *H04W 4/029* (2018.02)

(58) Field of Classification Search
CPC ........... G06Q 30/0261; G06Q 30/0267; G06Q 30/0269; H04W 4/029
See application file for complete search history.

(56) References Cited

U.S. PATENT DOCUMENTS 10,026,105 B2    7/2018  Kikuchi
2010/0211431 A1*  8/2010  Lutnick .................. G06Q 50/34
                                                            705/14.12
(Continued)

FOREIGN PATENT DOCUMENTS

JP    2014-191608         10/2014
JP    2014-203414 A       10/2014
(Continued)

OTHER PUBLICATIONS

International Search Report for PCT/JP2018/009473, dated Jun. 5, 2018.
(Continued)

*Primary Examiner* — Scott C Anderson
(74) *Attorney, Agent, or Firm* — Pearne & Gordon LLP

(57) ABSTRACT

Information service system 10 comprises a server 12 in which provision information such as advertisement, guidance, explanation, news, disaster information and other information is stored, a plurality of information service terminals 14 established at predetermined locations and connected to the server to have the location specified by the server 12 and to receive and provide the provision information according to the corresponding location and a user's terminal 16 positioned at predetermined location to display the same provision information as that provided by the information service terminal 14 established at the corresponding location among the plurality of information service terminals 14. The server specifies the information service terminal established at the location according to the current location of the user's terminal and transmits to the user's terminal the provision information to be provided by the specified information service terminal 14. Thus, by reducing the load of the information service terminals such as a digital signage, the light provision of the information can be achieved and the information service terminals can be (Continued)

simply established at low cost. Therefore, a chance of the provision of the information such as advertisement, etc. can be secured and the user's terminal can share the information such as the advertisement with a simple operation.

14 Claims, 3 Drawing Sheets

(56) References Cited

U.S. PATENT DOCUMENTS

| | | | |
|---|---|---|---|
| 2011/0028160 A1* | 2/2011 | Roeding | H04W 4/02 |
| | | | 455/456.1 |
| 2014/0297429 A1 | 10/2014 | Kikuchi | |
| 2015/0221147 A1* | 8/2015 | Daniel-Wayman | ........................... |
| | | | G07C 9/00571 |
| | | | 340/5.54 |
| 2015/0254045 A1* | 9/2015 | Drake | G06Q 30/0625 |
| | | | 345/1.3 |
| 2015/0281302 A1* | 10/2015 | Winston | H04L 67/1097 |
| | | | 709/219 |
| 2016/0323239 A1* | 11/2016 | Cheng | H04L 67/22 |
| 2017/0034668 A1* | 2/2017 | Berentsen | H04W 88/04 |

FOREIGN PATENT DOCUMENTS

| | | |
|---|---|---|
| JP | 2015-222880 A | 12/2015 |
| JP | 2016-143297 A | 8/2016 |
| JP | 2017-009652 A | 1/2017 |
| JP | 2017-033183 A | 2/2017 |
| TW | 201608533 A | 3/2016 |
| WO | 2015178363 A1 | 11/2015 |

OTHER PUBLICATIONS

Tanaka, Oga, "Development of a Linkage Mechanism for a Mobile Device to Support Actions After Viewing Contents an Information Display Media", DICOMO 2016, Jul. 2, 2014, vol. 2014, No. 1, pp. 2027-2034.

* cited by examiner

INFORMATION SERVICE SYSTEM AND INFORMATION SERVICE METHOD FOR PROVIDING LOCATION-SPECIFIC INFORMATION

TECHNICAL FIELD

This invention relates to an improvement on an information service system and an information service method comprising an information service terminal (media terminal) such as guidance means which provides an explanation of exhibits in a digital signage, an art gallery or a museum established in a street to provide information such as advertisement etc., for example, and more particularly relates to a system and a method for being able to easily and swiftly provide the information while reducing the load of an information service terminal and for being able to share the information such as advertisement also on user's terminals by a simple operation.

BACKGROUND ART

For example, a digital signage established in a street to provide information of an advertisement etc. has the information of the advertisement, etc. recorded on a server. The digital signage which receives the information provided from the server provides content such as an image, a sound etc. through a display and a speaker, etc.

In this case, conventionally, when a user wants to watch the provision information which is the content of the signage also on its personal digital terminal, the user itself reads the connection information of QR Code (Registered Trademark) etc. displayed on the advertising media such as the digital signage or a poster on the user's portable terminal and then performs an operation for connection, which has been commonly performed. Otherwise, the user holds up its terminal over the digital signage using NFC (Near Field Communication) installed in the digital signage so that the information provided by the digital signage is received by the user's terminal, which has been also conventionally performed.

Forcingly performing the plural operations of reading on the code and connecting and the operation of holding up the user's terminal takes much time, which causes inconvenience and therefore the user hates to obtain the information of advertisement while performing such operations. As a result, even if the information of advertisement has been shown, a chance of obtaining the precious information of advertisement will be fearfully lost. Even though the user doesn't feel the operation to take much time, in some cases, the user mentally doesn't want to show such operations of its reading and holding up or doesn't want to let the other parties know its obtaining the information and will give up the operation itself of obtaining the information and therefore, the user gives up the operation of obtaining the information. Furthermore, if the user doesn't recognize an existence of the digital signage in the circumference, the information cannot be shared. In addition thereto, even if the existence of the digital signage is recognized in the range in which its visual recognition is possible, the user needs to approach to the position near the signage. Thus, there has been a problem of the case where the access is impossible by being not able to approach to the digital signage located in a position far away or a large-sized display set in an upper wall part of a building, for example.

On the other hand, it has been proposed that the digital signage established in the street provides a user's terminal with an advertisement etc. by transmitting the provision information such as the advertisement etc., to the user's terminal (for example, refer to patent documents No. 1 through 4). However, if a comparatively big provision information (content) such as an image or animation etc. as an advertisement is directly transmitted to a user's personal digital terminal etc. from an information service terminal such as a digital signage, a big load will be applied to the digital signage and there is a possibility of affecting communication states so that transmission speed of various communications including communication with the server is reduced. Moreover, although a method of connection between the digital signage and the user's terminal will be performed chiefly by wireless communications, there is a possibility that there occurs a problem of a security because of its open network. In order to avoid such problems, it is necessary to establish the highly efficient digital signage equipment which can bear the load and as a result, the manufacturing cost of the digital signage equipment itself will increase. Moreover, according to this method, there has been a problem that there cannot be applied to an advertising medium which provides information of a poster, a signboard, a panel, etc. except an electronic information.

Furthermore, since the conventional digital signage has been generally a large-scale equipment mainly equipped with the big display, a big establishment space is required and therefore there have been problems in which the space cannot be easily reserved, the establishment cost also increases and it is difficult to easily establish the equipment in many places.

PRIOR ART DOCUMENT

Patent Documents

[PATENT DOCUMENT 1] JP2017-33183A
[PATENT DOCUMENT 2] JP2016-143297A
[PATENT DOCUMENT 3] JP2014-191608A
[PATENT DOCUMENT 4] JP2014-203414A

Problems to be Solved by the Invention

In consideration of the problems, the problems to be solved by the invention is to provide an information service system and an information service method in which light information provision service will be realized by reducing the load of the information service terminal such as a digital signage, the information service terminal is simply established at lower cost and a chance of the information provision service such as an advertisement is secured in many places and the information including the advertisement etc. is shared also on a user's terminal by simpler operation.

Means to Solve the Problems (1. Information Service System)

According to a first means of the invention to solve the problems, the invention is to provide an information service system comprising a server in which a provision information such as advertisement, guidance, explanation, news, disaster information and other information is stored, a plurality of information service terminals established in predetermined locations and connected to the server to have the location specified by the server and to receive and provide the provision information according to the corresponding location and a user's terminal positioned at predetermined location to display the same provision information as that provided by the information service terminal established at the corresponding location among the information service terminals, wherein the server specifies the information service terminal established at the location according to the current location of the user's terminal and transmits to the user's terminal the provision information to be provided by the specified information service terminal.

According to a second means of the invention to solve the problems, the invention is to provide the information service system according to the first means in which the plurality of information service terminals comprise identification information dispatch means to send its own identification information wherein the user's terminal receives the identification information sent by the information service terminal to transmit the corresponding identification information to the server and the server specifies the information service terminal established at the location corresponding to the current position of the user's terminal by the identification information sent from the user's terminal.

According to the third means of the invention to solve the problems, the invention is to provide the information service system according to the second means in which the user's terminal receives the identification information which the identification information dispatch means sends by wireless communications.

According to the fourth means of the invention to solve the problems, the invention is to provide the information service system according to the third means in which the user's terminal receives the identification information by Bluetooth (Registered Trademark) or Wi-Fi (Registered Trademark) according to a distance between the user's terminal and the information service.

According to the fifth means of the invention to solve the problems, the invention is to provide the information service system according to any of the first through fourth means in which the server recognizes the location of the current position of the user's terminal based on the GPS (Global Positioning System) information sent by the corresponding user's terminal to specify the information service terminal established at the location corresponding to the recognized location and to transmit to the user's terminal the same provision information as that to be provided by the specified information service terminal.

According to the sixth means of the invention to solve the problems, the invention is to provide the information service system according to any of the first through fifth means in which when at least two or more of the plurality of the information service terminals are specified as the information service terminals established at the location corresponding to the current position of the user's terminal, the server transmits the position information on the corresponding information service terminals to the user's terminal to thereby transmit the provision information to be provided by the corresponding information service terminals selected and processed by the user's terminal.

According to the seventh means of the invention to solve the problems, the invention is to provide the information service system according to any of the first through sixth means in which the server and the user's terminal communicate with each other by LTE (Long Term Evolution) or other portable high-speed communication.

According to the eighth means of the invention to solve the problems, the invention is to provide the information service system according to any of the first through seventh means in which the user's terminal starts the communication with the server or the reception of the identification information from the information service terminals by a shaking operation or a tapping operation of the user's terminal without reading any information including the code etc.

According to the ninth means of the invention to solve the problems, the invention is to provide the information service system according to any first through eighth means in which the information service terminals comprises a mobile information terminal or a combination of a mobile information terminal and a monitor.

(2. Information Service Method)

The invention also provides the following method using the first through ninth information service systems.

More concretely, according to the tenth means of the invention to solve the problems, the invention is to provide an information service method in which provision information such as advertisement, guidance, explanation, news, disaster information and other information is stored in a server, a plurality of information service terminals connected to the server is established at predetermined locations to specify the locations of the information terminals by the server and to receive and provide the provision information according to the locations from the server by the plurality of information service terminals and a user's terminal positioned at the predetermined locations displays the same provision information as that provided by the information service terminals established at the locations corresponding to the position of the user's terminal among the information service terminals positioned at the locations, wherein the server specifies the information service terminals established at the location according to the current location of the user's terminal and transmits to the user's terminal the provision information to be provided by the specified information service terminal.

According to an eleventh means of the invention to solve the problems, the invention is to provide the information service method according to the tenth means in which identification information dispatch means the plurality of information service terminals comprise sends its own identification information wherein the user's terminal receives the identification information sent by the information service terminal to transmit the corresponding identification information to the server and the server specifies the information service terminal established at the location corresponding to the current position of the user's terminal by the identification information sent from the user's terminal.

According to the twentieth means of the invention to solve the problems, the invention is to provide the information service method according to the eleventh means in which the user's terminal receives the identification information which the identification information dispatch means sends by wireless communications.

According to the thirteenth means of the invention to solve the problems, the invention is to provide the information service method according to the twentieth means in which the user's terminal receives the identification information by Bluetooth (Registered Trademark) or Wi-Fi (Registered Trademark) according a distance between the user's terminal and the information service terminal.

According to the fourteenth means of the invention to solve the problems, the invention is to provide the information service method according to any of the tenth through thirtieth means in which the server recognizes the location where the user's terminal is currently positioned based on the GPS (Global Positioning System) information the corresponding user's terminal sends to specify the information service terminal established at the location corresponding to the location recognized by the server and to transmit to the user's terminal the same provision information as that to be provided by the specified information service terminal.

According to the fifteenth means of the invention to solve the problems, the invention is to provide the information service method according to any of the tenth through fortieth means in which when at least two or more of the plurality of the information service terminals are specified as the information service terminals established at the locations corresponding to the current position of the user's terminal, the server transmits the position information on the corresponding information service terminals to the user's terminal to thereby transmit to the user's terminal the provision information to be provided by the corresponding information service terminals selected and processed by the user's terminal.

According to the sixteenth means of the invention to solve the problems, the invention is to provide the information service method according to any of the tenth through fifteenth means in which the server and the user's terminal communicate with each other by LTE (Long Term Evolution) or other portable high-speed communication.

According to the seventieth means of the invention to solve the problems, the invention is to provide the information service method according to any of the tenth through sixteenth means in which the user's terminal starts the communication with the server or the reception of the identification information from the information service terminal by a shaking operation or a tapping operation of the user's terminal without reading any information including the code etc.

According to the eighteenth means of the invention to solve the problems, the invention is to provide the information service method according to any of the tenth through seventieth means, in which a mobile information terminal or a combination of a mobile information terminal and a monitor is used as the information service terminal.

The Effect of the Invention

According to the invention, as above-mentioned, after specifying the information service terminal established in the location corresponding to the current position of the user's terminal by the server, it is not necessary to transmit the provision information such as advertisement and other information from the information service terminals such as the digital signage to the user's terminal for transmitting the provision information to be provided by the specified information service terminal from the server to the user's terminal, but not from these information service terminals (digital signage etc.) and therefore. As a result, no load due to transmission of provision information is applied to the information service terminal and the sufficient speed of processing the data can be secured on the communication with the server and the displaying of the information, etc., and the user's terminal can advantageously receive the provision information including advertisement etc., at the comfortable transmission speed etc. between the user's terminal and the server.

Moreover, according to the invention, as abovementioned, since the information service terminal never transmits the provision information such as the advertisement to the user's terminal, the simple construction is possible, and the information service terminal can be simply established at lower cost. As a result, they can be established in the various and many locations and therefore, a chance of provision of the information such as the advertisement can be secured. This causes the effectiveness of information provision to be achieved. For example, the information service terminal can be established near the rear face of the tangible medium such as a poster, a signboard, an explanation panel, a guidance panel and others. Thus, the provision information such as the advertisement which cannot be shared in synchronization with the display or the digital medium including transmission means without any use of them can be provided as the electronic information to the user's terminal and therefore can be applied to advertisement on paper medium etc., regardless of the kind of the medium. As a result, the provision information from the existing advertisement medium including the poster, the signboard, the panel as well as the digital medium such as the digital signage etc. can be simply provided as the electronic information to the user's terminal without any change of the size of the advertisement medium on its establishment.

According to the present invention, since the identification information of each itself of the plurality of information service terminals is sent as aforementioned by the identification information dispatch means which the plurality of information service terminals have and the user's terminal receives and transmits to the server the identification information which this information service terminal sends and the information service terminal established in the location corresponding to the current position of the user's terminal from the identification information transmitted from the user's terminal can be specified, the information service terminal can achieve its function if only its identification information is sent and therefore, the system can be manufactured and established with a simple configuration and at lower cost.

According to the present invention, as abovementioned, the user's terminal can receive the identification information which the identification information dispatch means of the information service terminal sends by wireless communications and more specifically, the identification information can be sent using the function with which the recent mobile terminal is usually provided by using Bluetooth (Registered Trademark) or Wi-Fi (Registered Trademark) as the wireless communication as it is. Thus, for example, a small and comparatively cheaper mobile communication terminal and other small communication nodes, etc. can be used as the information service terminal and therefore, the simple and inexpensive information service system can be advantageously constructed. Since a big burden is not put on an establishment person (a person in charge of an establishment place) of the information service terminal, the information service terminal can be established without any resistance and this can advantageously secure the opportunity of more information services such as advertisements. In other words, the information service terminals send their own identification information by these wireless communications as dispatch of the information to the user and the user's terminal which exists in the neighborhood receives the identification information to start the processing and the information service terminal does not require a big burden for communication. In this case, more particularly, for example, if the user's terminal is located within 5 m or less distance from the information service terminal, then the identification information can be received by Bluetooth (Registered Trademark) and if the user's terminal is located within 5 m to 25 m distance, then the identification information can be received by Wi-Fi (Registered Trademark). Thus, suitable communication can be performed according to the distance or the communication intensity.

Furthermore, according to the present invention, as abovementioned, since the server recognizes the location corresponding to the current position of the user's terminal based on the GPS (Global Positioning System referred to as "GPS" later) information which the user's terminal sends and the information service terminal established in the location corresponding to the recognized location is specified, even though the user's terminal is not positioned near the information service terminal and is in the distance (concretely more than 25 m) where the above-mentioned Bluetooth (Registered Trademark) or Wi-Fi (Registered Trademark) which the information service terminals send never reaches, it can specifies the information service terminal located on the periphery and the provision information can be offered to the user's terminal. Thus, even if the user does not recognize the existence and the position of the information service terminal concretely, the provision information can be shared in synchronization and therefore a chance of the precious advertisement is never missed while the user can surely obtain the provision of the useful provision information at the current position without recognizing the existence of the information service terminal.

Moreover, according to the present invention, as abovementioned, at least in the case where two or more information service terminals are specified by the server as the information service terminals established in the location corresponding to the current position of the user's terminal, in order to transmit the position information on the corresponding two or more information service terminals to the user's terminal and to transmit the provision information to be provided by the information service terminals selected and processed by the user's terminal to the user's terminal, even if the corresponding two or more information service terminals exist around the user's terminal, the user recognizes the existence and position of the information service terminals to receive the predetermined suitable provision information considered to be useful in the location of the current position of the user's terminal.

On the other hand, according to the present invention, as abovementioned, since the server and the user's terminal communicate with each other by LTE (Long Term Evolution referred to as "LTE" later) and other portable high-speed communication, the user can use its general mobile terminal as the user's terminal as it is without buying a special-purpose instrument and even though the user's terminal is not positioned in the circumstances where the user's terminal can be connected through the wireless LAN, the user's terminal can obtain the information service at a comfortable speed by high-speed communication.

In addition thereto, according to the present invention, as abovementioned, only by installing an application for exclusive use in the user's terminal once, the user's terminal can start the communication with the server and the reception of the identification information from the information service terminal by shaking or tapping operation of the user's terminal, without reading any information such as the code etc., each time. Therefore, the provision information (content) can be obtained by a simple operation, there is no resistance to the provision of the information and the user can secure the chance of the user to access to the advertisement and other provision information.

According to the present invention, as abovementioned, since the mobile information terminal can be used as the information service terminal, the system can be established in a simple manner and at low cost. Meanwhile, the mobile information terminal equipped with an output terminal of an image or a sound for example, can be used in combination with a monitor, and only by preparing a large-sized display simply, the needs for a genuine digital signage can be met.

THE FORM OF EMBODIMENT OF THE INVENTION

Figure 1:
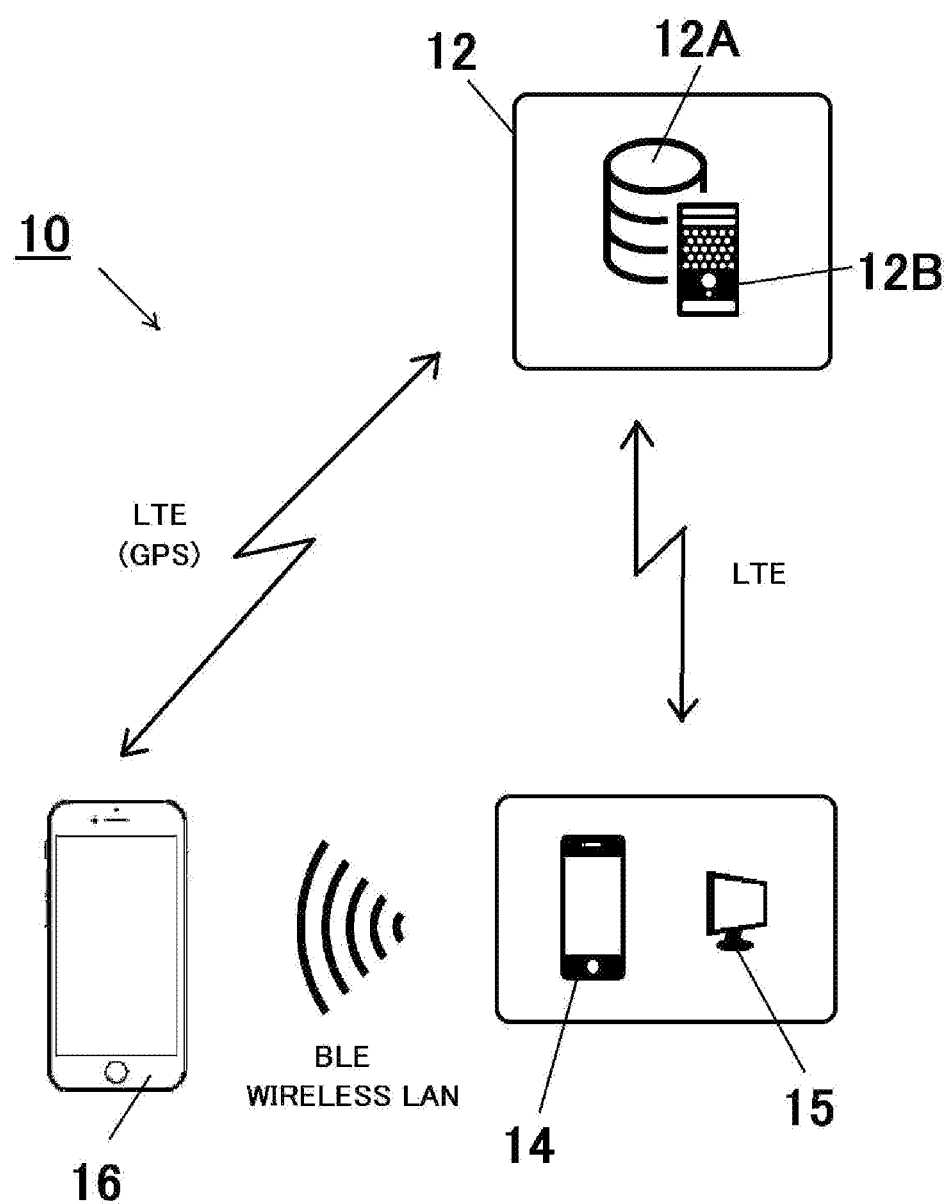
FIG. 1 is a schematic view of the construction of an information service system of the present invention.

Describing the form of the embodiment of the present invention in details in accordance with the drawings, FIG. 1 shows a summary configuration of an information service system 10 of the present invention, and as shown in FIG. 1, the information service system 10 comprises a server 12 in which advertisement or other provision information is stored, a plurality of information service terminals 14 established at predetermined locations and connected to the server 12 to receive and provide provision information according to the location specified by the server 12 from the server 12 and a user's terminal 16 positioned at predetermined locations to display the same provision information as the provision information provided by the information service terminals established in the locations corresponding to the predetermined locations among the plurality of information service terminals.

(1. The Kind of Provision Information and Establishment Places of the Information Service Terminals)

An advertisement, guidance, an explanation or a news flash, a disaster information, etc. if needed on an emergency can be provided as the provision information to be provided by the information service system 10 of the present invention. Therefore, the information of the information service terminals which can be established to display and provide the provision information in the predetermined locations may be an advertisement on a digital signage (an electronic advertisement medium) in a street, an explanation of the exhibits in an art museum, a museum, an aquarium, etc. and a store guidance in a department store or a shopping center, a sightseeing guidance in a sightseeing spot, etc. However, there is no limitation particularly in the kind and the location of the information, and it may be applied to the information which should send widely and to various locations where people gather. Moreover, the provision information may be provided in the present invention as images, pictures and voice data which are electronic information and such combination thereof.

(2. Server)

As shown in FIG. 1, the server 12 has the database 12A which stores the provision information, animation conversion means not shown to change into a suitable provision form the provision information which is electronic information if needed and control means 12B to control the whole system. This server 12 is connected to the information service terminals 14 and to the user's terminal 16, respectively by a LTE (or 4G) and other portable (movable body) high-speed telecommunications standard, as shown in FIG. 1.

The control means 12B of the server's 12 recognizes, controls and manages the plurality of information service terminals 14 established in each location using identification information including location information (information on the current position of the information service terminal established) etc., for example, assigned to each of the information service terminals 14. More concretely, the server 12 transmits to each of the information service terminals 14 the provision information to be provided by the information service terminal 14 according to the established location and set up the reproduction, the timing of the display and the times of the corresponding provision information. The provision information may be appropriately renewed if needed after the lapse of the predetermined time whereby the updated provision information can be provided.

The server 12 recognizes the location where the user's terminal 16 is currently positioned, specifies the information service terminals 14 established corresponding to the recognized location and transmits to the user's terminal 16. In other words, in the present invention, since the provision information to be provided by the specified information service terminal 14 is transmitted to the user's terminal 16 from the server 12, but not from the information service terminals, the provision information such as the advertisement etc. don't need to be transmitted from the information service terminals 14 such as the digital signage etc. Thus, no load due to the transmission of the provision information is applied to the information service terminals 14 whereby the sufficient speed of data processing can be secured on the transmission from the server 12 and the indication of the information while the user's terminal 16 can receive the provision information such as the advertisement etc. at comfortable communication speed through LTE etc. from the server 12.

(3. Information Service Terminal)

On the other hand, as abovementioned, the information service terminals 14 established in a street, an art museum, a sightseeing spot, etc. may be a digital signage for advertisement information, an explanation device for explanation information of exhibits which will specifically be established in the art museum etc., a special purpose instrument equipped with a comparatively large-sized display such as a guidance apparatus for shopping guide etc., or may be embedded in structures such as a pillar and a wall surface. However, it should be noted that it may be not necessarily restricted to the special-purpose instrument and there may be used a general-purpose small mobile information terminal like a smart phone or a tablet terminal.

This is because the information service terminals 14 don't transmit provision information such as the advertisement etc., to the user's terminal 16 and it is possible to have simple configuration in the present invention. Thus, since they can be established in the many various locations as a result of being able to be established in a simple manner and at low cost, many chances of information services such as advertisement can be secured and the effectiveness of the information service can be achieved.

As a result that the information service terminals 14 may be prepared and established at a relatively small size and in a simple manner, the information service terminals 14 may be specially established on a back face of a tangible medium such as a poster, a signboard, and a panel for explanation or guidance or near them. By this, unless the provision information service terminals are the digital media equipped with the display and the transmitting means until now, the provision information such as the advertisement of electronic information cannot be shared in synchronization therewith, but the provision information such as advertisement also on a paper media in spite of the kind of the medium may be provided as electronic information to the user's terminal 16. As a result, the provision information on the poster, the signboard, the panel etc. as well as the existing media such as the digital signage without adding any big change thereof on the establishment may be simply provided to the user's terminal as the electronic information.

Moreover, the information service terminals 14 of the present invention may be simply used without any special purpose instrument and without any addition of change of the existing media of course, and also in case where they are newly established, not only the provision information is received, but also the mobile information terminal equipped with output terminals of image or sound of HDM1 (Registered Trademark) may be used with a combination of a monitor 15 as shown in FIG. 1. Thus, only with the large-sized monitor 15 prepared, not only the provision information can be received, but also the needs to the real digital signage can be met. Namely, although the information service terminals 14 themselves don't transmit the provision information directly to the user's terminal 16 in various locations, they have a role for making the user recognize that useful information exists in a certain location like general digital signage, guidance apparatus, etc.

Each of the plurality of the information service terminals 14 is equipped with identification information dispatch means not shown to send its identification information at least. Each of the identification service terminals 14 always sends its identification information like broadcast to the circumstance by this identification information dispatch means. When its sent identification information is received by the user's terminal 16 positioned around the information service terminal 14, the corresponding information service terminal 14 and the user's terminal 16 positioned around the information service terminal 14 are associated with each other.

The user's terminal 16 receives the identification information sent by the information service terminal 14 to the server 12 and the server 12 specifies the information service terminal 14 established in the location corresponding to the current position of the user's terminal 16 by the identification information sent from the user's terminal 16. Namely, if the information service terminal 14 sends at least only the identification information of itself, the information service terminal 14 achieves its function without transmitting the provision information to the user's terminal 16. Thus, as abovementioned, the system can be manufactured and established with a simple construction and at low cost while being operated by the mobile information terminal such as smart phone etc. without any big load required for processing various electronic information.

In this case, the dispatch (receipt by the user's terminal 16) of the identification information from the information service terminals 14 may be performed by using wireless communication such as wireless LAN, etc., especially by Bluetooth (Registered Trademark) such as BLE (Bluetooth (Registered Trademark) Low Energy) or Wi-Fi (Registered Trademark). Since the identification information can be sent by using the function which a recent mobile terminal usually has as it is, as shown in FIG. 1, comparatively cheap mobile communication terminal, other small communication nodes, etc. such as a smart phone may be used as the information service terminals 14 and the information service system 10 may be simply configured at low cost.

Since the information service terminal 14 can be simply established at low cost without requiring a large-scale establishment construction, a big burden is not applied to the establishment person (person in charge of an establishment place) of the information service terminals 14 and the information service terminals 14 can be established without any resistance and therefore, more chance of the information services such as advertisements is secured. That is, the information service terminals 14 always send only the identification information by the wireless communications as the dispatch of the information to the user while the user's terminal 16 existing in the neighborhood receives their own identification information to start the processing. Thus, the system never applies a big burden to the communication.

In this case, the user's terminal 16 can receive the identification information according to the distance between the user's terminal 16 and the information service terminals 14, the user's terminal 16 by Bluetooth (Registered Trademark) or Wi-Fi (Registered Trademark). More particularly, the user's terminal 16 may receive the identification information by Bluetooth (Registered Trademark) in case where the user's terminal 16 is within the distance of less than 5 m from the information service terminals 14, by Wi-Fi (Registered Trademark) in case where the user's terminal 16 is within the distance of more than 5 m and less than 25 m and the suitable communication may be performed according to the distance or the communication intensity.

(4. User's Terminal)

As shown in FIG. 1, there may be used as the user's terminal 16 a mobile information terminal such as a smart phone or a tablet PC which is generally owned or used by the user as it is. Namely, the user's terminal 16 such as the smart phone can communicate with the servers 12 like the usual mobile communication by the LTE and other portable high-speed communication which is the peculiar communication function.

Thus, the user can use the general mobile terminal as the user's terminal as it is without buying any peculiar instrument and even if the user's terminal 16 is not located under the environment where the user's terminal 16 can be connected to wireless LAN, the provision information can be received at comfortable speed through the high-speed communication.

This user's terminal 16 has a GPS function for specifying its own position as its peculiar function. Therefore, the server 12 can also recognize the location in which the user's terminal 16 is currently positioned based on the GPS information which the corresponding user's terminal 16 sends. Although especially the server 12 needs to recognize the location where the user's terminal 16 is currently positioned, even if it is a case where any information service terminal 14 does not exist in the circumference of the user's terminal 16 and the user's terminals 14 cannot receive the identification information depending on wireless communications such as Bluetooth (Registered Trademark), the system of the invention can be operated.

Namely, using this GPS information, the server 12 specifies the information service terminals 14 in the circumstance even if the user's terminal 16 is at the distance (specifically more than 25 m) where there reaches neither Bluetooth (Registered Trademark) nor Wi-Fi (Registered Trademark), for example which the information service terminals 14 send and transmits to the corresponding user's terminal 16 the same provision information as that to be provided by this specified information service terminals 14. This causes the provision information to be able to be shared even from the state where the user recognizes concretely neither the existence nor the position of the information service terminals 14. As a result, that the provider of the information will not miss the chance of the precious advertisement while the user can surely receive the provision of the useful information at the current position without the user's being conscious of the existence of the information service terminals 14.

In this case, the server 12 can set up so as to specify the information service terminals 14 which exist within 2 km distance from the location where the user's terminal 16 is currently positioned, for example using its identification information. This is because even if the user receives the provision of the information at a location where it takes several hours, for the user to move, it is not useful for the user, rather, the information required at real time is generally the information at the distance where visual is possible or the walking time is about ten or more than minutes. However, the distance is not particularly limited, other distance can be set up and the extensive information can be provided without any limitation of distance. Furthermore, the system may have such specification that the distance to be caught by the user's terminal 16 may be optionally or selectively set up. This causes the user to be able to be available for the information regarding tourist facilities, commercial establishment, leisure facilities, etc. which exist in the circumference even if the user itself does not know what kind of spot exists in the circumference of its current position, for example. The recognition of the location where the user's terminal 16 is currently positioned based on this GPS information may be also applied to the case where the information service terminals 14 have no function to send the abovementioned identification information.

Furthermore, when the information service method is performed by the information service system 10, it can be achieved by installing an application software for exclusive use in the user's terminal 16. As abovementioned, the provision of information according to the information service system 10 of the present invention starts from associating the user's terminal 16 and the information service terminal 14 with each other and the application software allows the user's terminal 16 to be able to obtain the information regarding the existence of the information service terminal 14.

Concretely, the user's terminal 16 initiates the receipt of the identification information of the information service terminal 14 which exists in the circumstance by shaking or tapping operation or if the identification information cannot be received, the user's terminal 16 sets up so as to initiate the operation of recognition of its own GPS information by the server 12. Thus, only by installing the application software for exclusive use in the user's terminal 16 once, the user can be available for the provision information (content) by a simple operation of shaking or tapping of the user's terminal without reading the information of code etc. each time and therefore, there is no resistance against the provision of the information and the user can secure the chance of access to more advertisement and other provision information.

In the case where only the single information service terminal 14 is specified, the provision information to be provided by the corresponding information service terminal 14 is transmitted from the server 12 to the user's terminal 16, but in the case where the user's terminal 16 receives the identification information of the two or more information service terminals 14 simultaneously or if here are specified the two or more information service terminals 14 established in the locations corresponding to at least the recognized location as a result of judgement based on GPS information, the server 12 transmits to the user's terminal 16 the identification information of the corresponding two or more information service terminals 14, the information regarding the corresponding information service terminals 14 is displayed on a map by the application software for exclusive use installed in the user' terminal 16 to thereby put into the state where the user can select any of the information service terminals 14. In this manner, the provision information to be selected and processed by the user's terminal 16 and to be provided by the corresponding information service terminals 14 can be transmitted to the user's terminal 16.

Thus, if the two or more information service terminals 14 exist around the user's terminal 16, the user can recognize the existence and position of the information service terminals 14 and can receive the suitable provision information which the user considers to be useful in the locations which are currently positioned. Concretely, in the art museum where two or more works of art are exhibited, for example, when two information service terminal 14 established in Work A and the information service terminal 14 established in Work B are recognized, the user can select the information service terminal 14 established in the work exhibited nearer the user or the information service terminal 14 established in the work which the user wants to access to thereby obtain the explanation information about the corresponding work. Instead of such a selective manner, if the server 12 can distinguish the distance between the user's terminal 16 and the information service terminal 14 by the means of obtainment of the identification information (Bluetooth (Registered Trademark or Wi-Fi (Registered Trademark)), it will be able to be set up so that the provision information to be provided by the information service terminal 14 nearer the user's terminal 16 can be transmitted to the user's terminal 16.

(5. The Information Service Method, Part 1—Advance Preparation)

Next, the information service method using the information service system 10 of the present invention will be explained. First, an application software for exclusive use is installed in the information service terminals 14 as a premise of embodiment of the information provision method by the operation of the system 10, the information service terminals 14 are established in predetermined locations and the identification information (account) such as location information (information of position where they are established), for example is assigned to the respective information service terminals 14. The server 12 can recognize each of the information service terminals 14 using this identification information. As abovementioned, the identification information may be the same as the identification information which the information service terminals themselves send around them or the information (configuration thereof) specially assigned for recognition by the server 12 separately from the former. In the latter case, the special identification information should be associated with the identification information which the information service terminals 14 themselves sends.

The user's terminal 16 may set and registers account information for every user by accessing the server 12 through the exclusive site or the installed application software for exclusive use. Since the existing mobile terminal may be used for the information service terminals 14 or the user's terminal 16 as abovementioned, the advance preparation requires no large troubles and cost.

Figure 2:
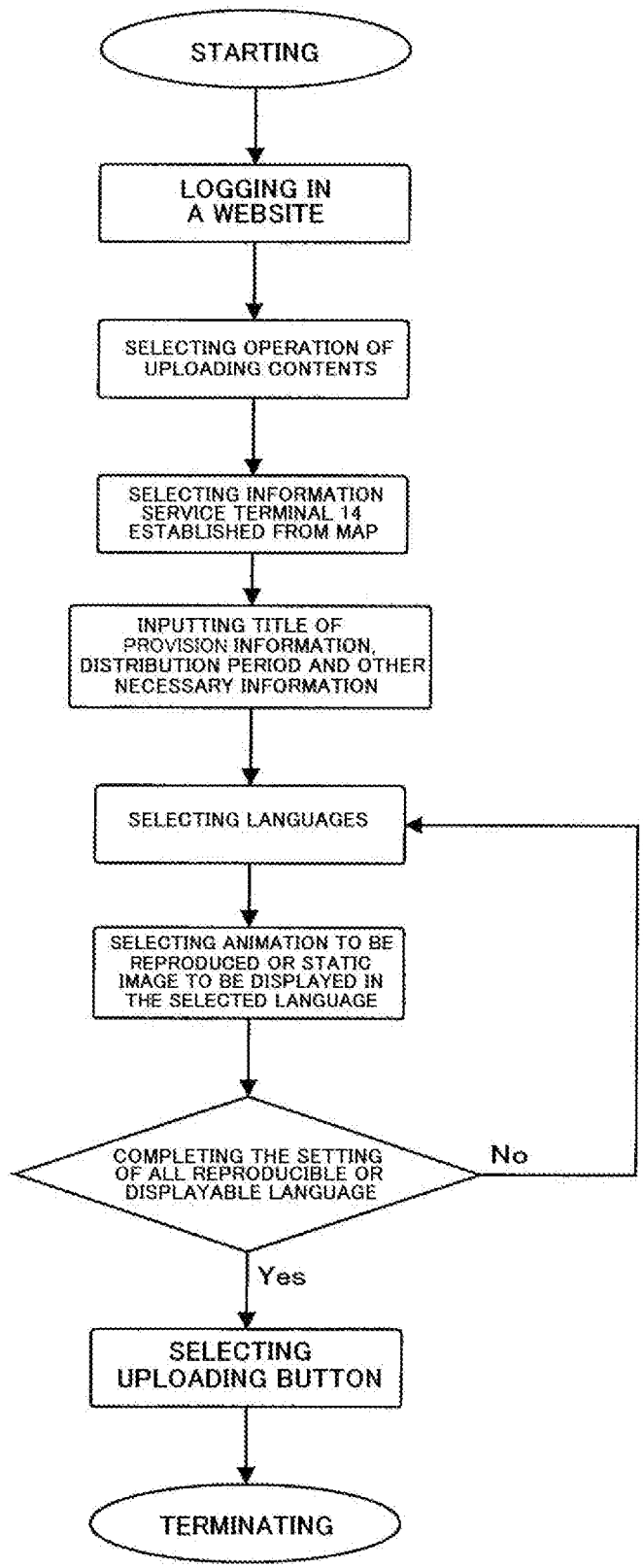
FIG. 2 is a flow chart in the state of setting up provision information to an information service terminal by a server according to the invention.

On the other hand, on the side of the server 12, (on the operation side of the system 10), there are operations of setting up of each of the information service terminals 14 as shown in FIG. 2. After being connected to the exclusive site where the locations of the information service terminals 14 can be displayed on the map based on the identification information including the location information, the user selects the operation of content uploading to thereby select the information service terminal 14 to be set up among the information service terminals 14 displayed on the map.

Thereafter, the information such as a title of provision information and a distribution period necessary for the provision of the information is input to the information service terminals 14 to be set up and then languages for the reproduction and the display of the provision information are selected.

In this case, in consideration of the globalization in recent years, it will be desirable to set up not only Japanese, but also a plurality of languages such as English, French and other foreign languages as the reproduction languages and display languages of the provision information. This will be conveniently suitable for foreign visitors. The function of the information service system 10 can be demonstrated to the maximum extent also in the explanation and guidance to foreigners visiting to the tourist resorts or to Olympic Games and other international events, for example. On the other hand, it will be desirable to set up on the side of the user's terminal 16 the languages of reproduction and display by the peculiar application software for exclusive use according to the aforementioned setting up on the side of the server 12.

It will be not always necessary to set up the system so as to enable the reproduction and the display in various languages in all the provision information and the provision information (content) reproducible or displayable may be different every language if necessary. Thus, as shown in FIG. 2, in the corresponding information service terminal(s) 14 to be set up, the reproducible and displayable provision information is selected in the selected language and this operation is repeated until it is completed regarding all the languages in which the information can be reproduced and displayed. After the setting up is completed regrading all the reproducible and displayable languages, the setting up is completed by up-loading the corresponding provision information to the corresponding information service terminal 14. This is performed on all the information service terminals 14. The provision information and the setting information such as the distribution period may be appropriately updated if necessary. The operation of the system 10 can start in the step in which the setting up of the server 12 and at least one information service terminal 14 completes. Then, in the case where the information service terminal 14 is newly established, the setting up is performed sequentially and the information service terminal 14 to be managed and controlled may be added and stored.

(6. Information Provision Method Part 2—Provision of Information)

Figure 3:
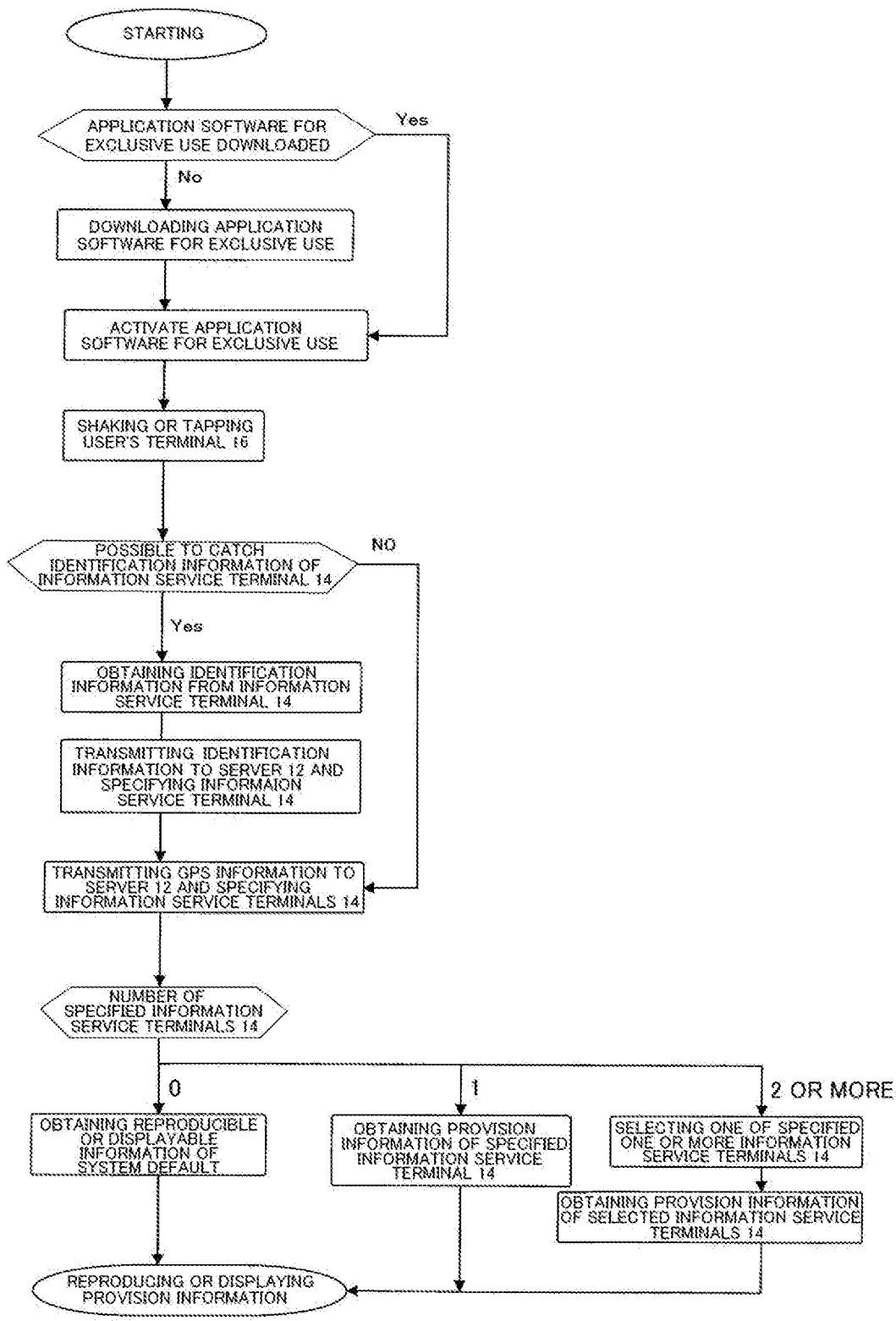
FIG. 3 is a flow chart of the provision procedure of the provision information by an information service method using the information service system of the present invention.

Next, the procedure for the user's receiving the provision of the provision information (reproduction and display of the contents) will be explained. As shown in FIG. 3, If the application software for exclusive use is not installed in the user's terminal 16, first of all, the application software is downloaded and then the application software for exclusive use starts after its installation.

In this state, in the case where the user wants to obtain the provision information seeing the information service terminal 14 which is a digital signage which reproduces or displays the provision information such as an advertisement etc., in the street in a certain location, wants to know whether there is some useful provision information around here even if the user does not recognize the existence of the information service terminal 14 at the current position and wants to reproduce and display the provision information on the user's own terminal 16, the application software is set as shown in FIG. 3, in the case where the user's terminal 16 is a smart phone, for example, having the size so as to be able to be grasped by the user's hand, the shaking thereof is performed and in the case where it is a tablet terminal, the tapping thereof is performed. By these operations, the user's terminal 16 initiates the operation in which it catches the provision information of the information service terminal 14 such as a digital signage, an explanation device or a guidance device.

In the case where the information service terminal 14 exists near the user's terminal 16, and the user's terminal 16 obtains the identification information from the certain information service terminal 14 by Bluetooth (Registered Trademark) or Wi-Fi (Registered Trademark), the user's terminal 16 transmits the identification information to the server 12 through the Internet by communication of LTE etc. As shown in FIG. 3, after the server 12 specifies the information service terminal 14 established in the location corresponding to the current position of the user's terminal 16 based on this transmitted identification information, the server 12 transmits to the user's terminal 16 the provision information which this specified information service terminal 14 should provide. In this case, in order to specify the information service terminal 14 established in the location corresponding to the current position of the user's terminal 16 using the identification information which the information service terminal 14 sends, it is not always necessary to obtain the information on the current position of the user's own terminal 16 on the side of the server 12.

On the other hand, in the case where the information service terminal 14 does not exist near the user's terminal 16 whereby the user's terminal 16 cannot obtain the identification information, as shown in FIG. 3, the user's terminal 16 transmits to the server 12 the GPS information on its own current position. The server 12 recognizes the location where the user's terminal 16 is currently positioned, based on the GPS information which the user's own terminal 16 sends, specifies the information service terminal 14 established in the location corresponding to this recognized location, and transmits to the corresponding user's terminal 16 the same provision information as the provision information which this specified information service terminal 14 should provide. Thus, even if the user cannot recognize the specific information service terminal 14, the provision of the provision information is possible.

In the present invention, at least, if the current position of the user's terminal 16 can be recognized using the GPS information, the provision information can be provided anyway even if the distance between the user's terminal 16 and the information service terminal 14 is small or large. Thus, in consideration of trouble or cost of the establishment and the operation and also in consideration of the load and the configuration of the information service terminal 14, the identification of the information service terminal 14 established in the location corresponding to the current position of the user's terminal 16 may not be limited to the procedure based on this GPS information. Otherwise, as shown in FIG. 3, the process of confirmation of the current position of the user's terminal 16 at least according to GP information may be essentially undergone. In this case, the information service terminal 14 can also have no function of sending its identification information, which advantageously causes the information service system 10 to be built in a simpler and inexpensive manner. Otherwise, while maintaining both of the process by the dispatch of the identification information by the information service terminal 14 and the process based on the GPS information, it is so set that either of the processes may be selected or they may be limited to either of them in the user's terminal 16.

In this manner, as a result of specifying the information service terminal 14 established in the location corresponding to the current position of the user's terminal 16 in the server 12, as shown in FIG. 3, in the case where only the single information service terminal 14 is specified, the provision information which the information service terminal 14 should provide is transmitted from the server 12 to the user's terminal 16 from a server 12, in the user's terminal 16 and can be shared synchronizing with the information service terminal 14 to reproduce and display the provision information.

In the case where the server 12 cannot recognize the information service terminal 14 established in the location corresponding to the current position of the user's terminal 16 in either of the processes, namely, in the case where the information service terminal 14 does not exist in the circumference, there is no provision information which can be provided and therefore, as shown in FIG. 3, the information which is initially set as a system default may be transmitted to the user's terminal 16, or the information that there exists no information service terminal 14 in the circumference may be transmitted to the user's terminal 16, and the information may be reproduced or displayed.

Furthermore, in the case where the server 12 receives simultaneously the identification information on two or more information service terminals 14 from the user's terminal 16 or as a result of being judging based on GPS information, the two or more information service terminals 14 are specified at least as the information service terminals 14 established in the location corresponding to the current position of the user's terminal 16, as shown in FIG. 3, the position information on the corresponding two or more information service terminals 14 is transmitted to the user's terminal 16 and by displaying on the map these corresponding two or more information services 14 by the application software for exclusive use installed in the user's terminal 16, the user has the state of being able to select the information service terminals 14. Thus, the provision information to be provided by the information service terminals 14 selectively processed by the user's terminal 16 is transmitted to the user's terminal 16.

In this manner, the user's terminal 16 which receives the provision information from the server 12 can reproduce or display the received provision information to be able to provide the provision information to the user. In this case, the individual data of the provision information (contents) is transmitted to the user's terminal 16 to obtain it thereon and the user's terminal 16 can reproduce or display the data independently from the information service terminals 14 or can simultaneously share the provision information of the specified information service terminals 14 in synchronization therewith. Namely, the provision information is transmitted in synchronization from the server 12 not only to the information service terminals 14, but also to the user's terminal 16 and the user's terminal 16 can reproduce or display the provision information in the same manner as in the information service terminals 14. In addition thereto, if news flash or urgent disaster information etc. which should be notified according to the current position of the user's terminal 16 occurs, this information can be independently transmitted from the server 12 to the user's terminal 16 with making its association with the reproduction and display in the information service terminals 14 or without making its association with them to reproduce and display it.

INDUSTRIAL AVAILABILITY

The present invention is widely applicable to an advertisement by a digital signage (an electronic advertising medium) established in a street, an explanation of exhibits in an art museum, a museum, an aquarium, etc. and a store guidance in a department store or a shopping center, sightseeing guidance in a sightseeing spot, etc., for example.

EXPLANATION OF NUMERALS

10 Information service system
12 Server
12A Database
12B Control means
14 Information service terminal
15 Monitor
16 User's terminal

The invention claimed is:

1. An information service system comprising a server having a processor and a memory in which content of a provision information such as advertisement, guidance, explanation, news, disaster information and other information is stored, a plurality of information service terminals established in predetermined locations and connected to the server to have the location specified by the server and to receive and provide the provision information according to the corresponding location and a user's mobile terminal connected to at least one of the plurality of information service terminals via a short-range wireless communication protocol, wherein the plurality of information service terminals comprise identification information dispatch means configured to always send only corresponding identification information to said user's mobile terminal located at said predetermined locations and the user's mobile terminal comprising identification dispatch means to transmit the identification information received from the information service terminal to the server and reception means configured to receive the provision information from the server, wherein the server specifies the information service terminal established at the location corresponding to the current position of the user's mobile terminal using the identification information sent from the user's mobile terminal and sends to the user's mobile terminal the same provision information as that provided by the specified information service terminal, whereby the user's mobile terminal obtains the same content as that displayed on the specified information service terminal.

2. The information service system as set forth in claim 1, wherein the user's mobile terminal receives the identification information from the identification information dispatch means by wireless communications.

3. The information service system as set forth in claim 2, wherein the user's mobile terminal receives the identification information by the short-range wireless communication protocol according to a distance between the user's mobile terminal and the information service.

4. The information service system as set forth in claim 1, wherein when at least one or more of the plurality of the information service terminals are specified as the information service terminals established at the location corresponding to the current position of the user's mobile terminal, the server transmits the position information on the corresponding information service terminals to the user's mobile terminal to thereby transmit the provision information to be provided by the corresponding information service terminals selected and processed by the user's mobile terminal.

5. The information service system as set forth in claim 1, wherein the server and the user's mobile terminal communicate with each other by LTE (Long Term Evolution) communication.

6. The information service system as set forth in claim 1, wherein the user's mobile terminal starts the communication with the server or the reception of the identification information from the information service terminals by a shaking operation or a tapping operation of the user's mobile terminal without reading a Quick Response (QR) code associated with the provision information.

7. The information service system as set forth in claim 1, wherein the information service terminals comprise a mobile information terminal and the mobile information terminal is combined with a monitor.

8. An information service method comprising the steps of storing a content of provision information such as advertisement, guidance, explanation, news, disaster information and other information in a server having a processor and a memory, establishing a plurality of information service terminals connected to the server to display the provision information, wherein a user's mobile terminal located at predetermined locations, connected to at least one of the plurality of information service terminals via a short-range wireless communication protocol, and being able to receive the same provision information as that of the corresponding information service terminal while each of the information service terminals to the user's mobile terminal always sends only the identification information without sending its own provision information whereby the user's mobile terminal receives the identification information sent by the information service terminal established at predetermined locations to transmit the received identification information to the server and the server specifies the information service terminal established at the location corresponding to the current position of the user's mobile terminal by the identification information sent from the user's mobile terminal to send to the user's mobile terminal the provision information of the corresponding information service terminal established at predetermined locations, whereby the user's mobile terminal obtains the same content as that displayed on the specified information service terminal.

9. The information service method as set forth in claim 8, wherein the user's mobile terminal receives the identification information from the information service terminal by wireless communications.

10. The information service method as set forth in claim 9, wherein the user's mobile terminal receives the identification information by the short-range wireless communication protocol according a distance between the user's mobile terminal and the information service terminal.

11. The information service method as set forth in claim 8, wherein when at least two or more of the plurality of the information service terminals are specified as the information service terminals established at the locations corresponding to the current position of the user's mobile terminal, the server transmits the position information on the corresponding information service terminals to the user's mobile terminal to thereby transmit to the user's mobile terminal the provision information to be provided by the corresponding information service terminals selected and processed by the user's mobile terminal.

12. The information service method as set forth in claim 8, wherein the server and the user's mobile terminal communicate with each other by LTE (Long Term Evolution) communication.

13. The information service method as set forth in claim 8, wherein the user's mobile terminal starts the communication with the server or the reception of the identification information from the information service terminal by a shaking operation or a tapping operation of the user's mobile terminal without reading a Quick Response (QR) code associated with the provision information.

14. The information service method as set forth in claim 8, wherein the information service terminal is a mobile information terminal and the mobile information terminal is combined with a monitor.

\* \* \* \* \*